J. I. Vedder,
Cage Trap,
Nº 9,009. Patented June 8, 1852.
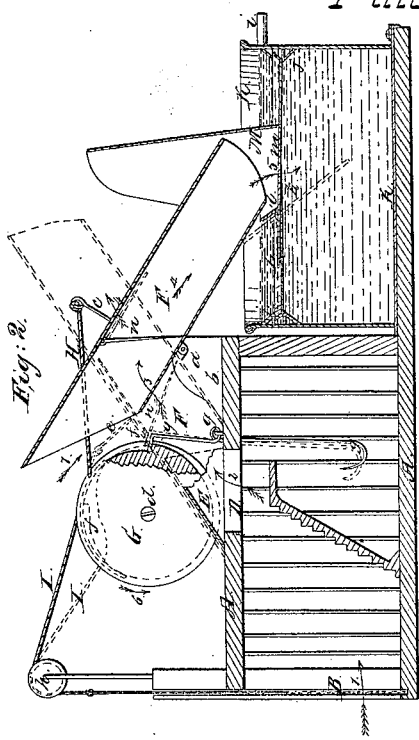
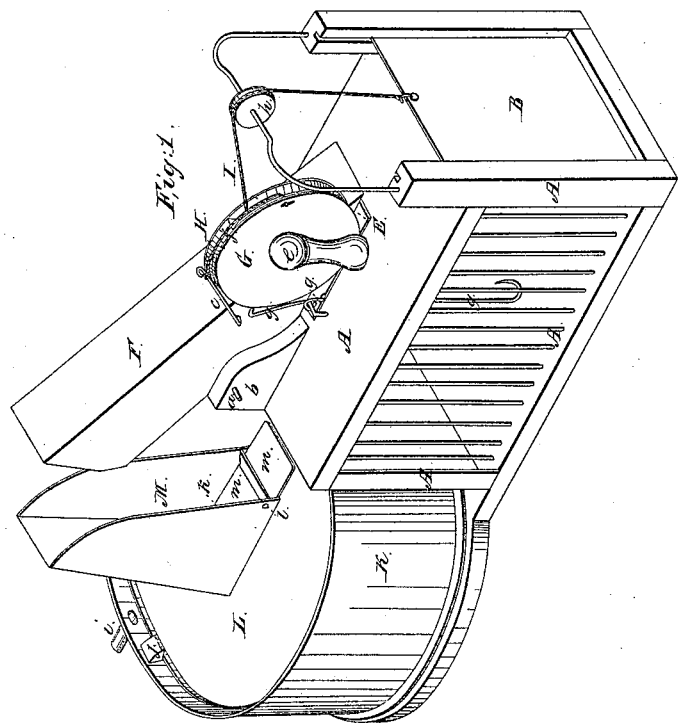

UNITED STATES PATENT OFFICE.

JOHN I. VEDDER, OF SCHENECTADY, NEW YORK.

RAT-TRAP.

Specification of Letters Patent No. 9,009, dated June 8, 1852.

*To all whom it may concern:*

Be it known that I, JOHN I. VEDDER, of Schenectady, in the county of Schenectady and State of New York, have invented certain new and useful Improvements in Rat-Traps; and I do hereby declare that the following is a full, clear, and exact description of the same, reference being had to the accompanying drawings, forming part of this specification, in which—

Figure 1, is an isometrical perspective view of one of my improved traps, the door or entrance for the rat being closed. Fig. 2, is a vertical longitudinal section, the door being raised and the trap set.

Similar letters of reference in the two figures indicate corresponding or similar parts.

The nature of my invention consists in a novel and simple arrangement of mechanism, which is placed or arranged on the top of the trap; by means of which the rat, after he has been caught, is made, through his own weight to reset the trap for his fellow rat, and after resetting the trap he is precipitated into a tub or barrel filled with water and drowned.

To enable others skilled in the art to make and use my invention, I will proceed to describe its construction and operation.

A, represents the trap or box into which the rat first enters, through the opening or door B. In the top of the trap A, there is an opening D, through which the rat is allowed to pass, after he has been entrapped; around this opening a guard E, is placed, and over which one end of an inclined rocking or tilting passage, or spout F, (open at both ends), fits and prevents the escape of the rat from the trap. This passage or spout E, is hung loosely on a pin $a$, secured and turning in the journal boxes $b$, $b$, fixed on top of the trap, and vibrates or rocks back and forth when operated upon by the rat, in the manner hereinafter described. To one side of this inclined spout a rod $c$, is secured, and extends up for some distance above the top of the spout as represented in Fig. 1. In the spout F, a set of teeth is placed; these teeth turn freely, and prevent the rat from passing back; after he discovers his danger, as they instantly fall after the rat passes them.

G, represents a pulley, turning on a shaft $d$, secured in suitable bearings $e$, on top of the trap. In the groove of this pulley there is a projection or catch $f$, (represented clearly in Fig. 2) upon which, one part of the hook $g$, on which the bait is secured, catches when the trap is set.

H, is a cord secured to the rod $c$, and also attached to the pulley G, in the manner represented in the drawing. This cord raises or pulls up the rocking or tilting passage to its position (shown in red lines) over the guard E, when the door falls. I, is another cord, secured in the groove of the pulley G, and passing over the small pulley $h$, and then secured to the door J, as represented. This cord raises the door when the spout or passage E, is tilted or vibrated by the weight of the rat, and also allows of its falling when the hook $g$ is disengaged from the catch $f$, in the groove of the pulley. The way in which the hook $g$, is bent for the purpose of hooking on the projection $f$, and also for disengaging itself from the same, when the rat touches the bait will be clearly seen by referring to the drawing Fig. 1. And by referring to Fig. 2, the peculiar manner in which the groove is cut in the pulley G, for forming the catch or projection on which the hook $g$ is made to hook, will be clearly seen.

K, represents a barrel or tub filled with water; this tub has a top L, which is not quite as large in diameter as the tub K; this top is secured to the tub by lugs $j$, $j$. The object in making the top of less diameter than the barrel or tub is for the purpose of allowing the water, when a number of rats get into it, to flow off, or rise above its surface and pass off through the pipe $i$; and also for admitting air. In this top L, an opening $k$, is made; over this opening a tilting or rocking door $m$, (secured, and turning on a shaft $l$,) is placed. A guard M, is also placed around this opening for preventing the rat escaping as he passes down the inclined passage F; one end of which always passes into this guard, and thus causing the rat to be always thrown on the tilting or rocking door, which gives way as soon as his weight comes onto it and thereby allowing him to descend into the water or tub and be drowned. The arrows 1, 2, 3, 4 and 5 indicate the track of the rat.

The operation of this trap is as follows: As soon as the rat enters the door B and commences nibbling at the bait, the hook $g$, is operated upon and disengaged from the catch or projection $f$; this causes the door to fall and assume the position shown in red; and the pulley G by the weight of the door is turned a short distance around in the direction of the arrow 6 and made to occupy the place shown in red lines; thereby, (through the cord H) raising the inclined tilting passage F, to the position, over the guard E, indicated in red. As soon as the rat discovers that he has been entrapped he immediately seeks a way of escape, and being attracted by a light or opening through the top of the trap, he ascends the stairs, placed for his accommodation, and passes through the opening D, and pursues his onward course along the inclined spout or passage F. After he passes the set of teeth $n$, and raising them to the position shown in dotted red lines he by his own weight tilts or vibrates the passage F, and causes it to assume the position shown in Fig. 2 by black lines; thereby resetting the trap for his fellow rat. After the passage has been tilted and he should desire to return he will find it impossible to do so, the comb or teeth $n$, having fallen and closed the passage after him; he is therefore obliged to proceed onward, when suddenly he finds himself precipitated into a pail or tub of water, the yielding door $m$, having gave way and occupied the position shown in red lines. By this simple arrangement, it will be seen that a number of rats can be caught and drowned in one day by simply setting the trap once; and that there is no donger of their escaping as they are instantly drowned. To effect this latter object is very important as it is very troublesome to kill or destroy rats if a number are caught in one trap; some, most generally escape.

The simplicity of my arrangement and the effectual manner in which it operates are the principal features that I consider make my trap superior to others in use.

What I claim as my invention and desire to secure by Letters Patent, is—

The employment of the pulley G, $f$, cords H, I, hook $g$, and inclined tilting passage F, the whole being arranged as described and operating in combination with the tub K; having a tilting door $m$, arranged on the top of the same, and a guard M, placed around the door $m$, in the manner and for the purpose herein specified.

JOHN I. VEDDER.

Witnesses:
J. D. HARMON,
ABIJAH ENOS.